US011255309B2

(12) United States Patent
Schulten

(10) Patent No.: US 11,255,309 B2
(45) Date of Patent: Feb. 22, 2022

(54) SYSTEM AND METHOD FOR INCREASING MECHANICAL INERTIA OF A WIND TURBINE ROTOR TO SUPPORT A POWER GRID DURING AN OVER-FREQUENCY OR UNDER-FREQUENCY DISTURBANCE OF THE GRID

(71) Applicant: General Electric Company, Schenectady, NY (US)

(72) Inventor: Christoph Schulten, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/114,358

(22) Filed: Aug. 28, 2018

(65) Prior Publication Data

US 2020/0072194 A1 Mar. 5, 2020

(51) Int. Cl.
| *F03D 7/04* | (2006.01) |
| *F03D 7/02* | (2006.01) |
| *F03D 9/25* | (2016.01) |
| *H02J 3/38* | (2006.01) |
| *H02P 101/15* | (2016.01) |

(52) U.S. Cl.
CPC ......... *F03D 7/0284* (2013.01); *F03D 7/0276* (2013.01); *F03D 7/047* (2013.01); *F03D 9/255* (2017.02); *H02J 3/386* (2013.01); *F05B 2270/1032* (2013.01); *F05B 2270/337* (2013.01); *H02P 2101/15* (2015.01)

(58) Field of Classification Search
None
See application file for complete search history.

(56) References Cited

U.S. PATENT DOCUMENTS

| 8,686,581 B2 * | 4/2014 | Harms ................. F03D 7/0284 290/44 |
| 9,115,695 B2 * | 8/2015 | Bech ..................... F03D 7/0276 |
| 9,163,611 B2 * | 10/2015 | Santiago Benito ... F03D 7/0224 |

(Continued)

FOREIGN PATENT DOCUMENTS

EP  2 826 992 A1  1/2015

OTHER PUBLICATIONS

European Search Report, dated Jan. 15, 2020.
(Continued)

*Primary Examiner* — Tulsidas C Patel
*Assistant Examiner* — S. Mikailoff
(74) *Attorney, Agent, or Firm* — Dority & Manning, P.A.

(57) ABSTRACT

A method for operating a wind turbine connected to a power grid in response to one or more grid events occurring in the power grid includes monitoring, via one or more sensors, the power grid (such as a frequency thereof) so as to detect one or more grid events occurring in the power grid. In response to detecting one or more grid events occurring in the power grid, the method includes increasing mechanical inertia of a rotor of the wind turbine during a first time frame after one or more grid events occurs in the power grid. After the first time frame, the method includes providing a required additional power output to the power grid during a subsequent, second time frame so as to stabilize the power grid after one or more grid events occurs in the power grid.

8 Claims, 4 Drawing Sheets

(56) References Cited

U.S. PATENT DOCUMENTS

| | | | |
|---|---|---|---|
| 2007/0159737 A1* | 7/2007 | Wobben | F03D 9/255 361/20 |
| 2012/0211982 A1* | 8/2012 | Tanabe | F03D 7/0272 290/44 |
| 2013/0043845 A1* | 2/2013 | Harms | F03D 7/0284 322/17 |
| 2014/0246856 A1* | 9/2014 | Santiago Benito | F03D 7/0224 290/44 |
| 2014/0316592 A1* | 10/2014 | Haj-Maharsi | F03D 7/0284 700/287 |
| 2015/0021912 A1* | 1/2015 | Bech | F03D 7/0276 290/44 |

OTHER PUBLICATIONS

Aimene Merzal et al., Flatness-Based Control Strategy of a Grid-Connected PMSG Offshore Wind Farm to Participate in Primary Frequency Control, 2016 Eleventh International Conference on Ecological Vehicles and Renewable Energies, University of Le Havre. Le Havre. France, Apr. 6, 2016, pp. 1-7.

Erlich I et al., Primary frequency control by wind turbines, 2010 IEEE Power and Energy Society General Meeting, Minneapolis, Minnesota, USA, Jul. 25, 2010, pp. 1-8.

* cited by examiner

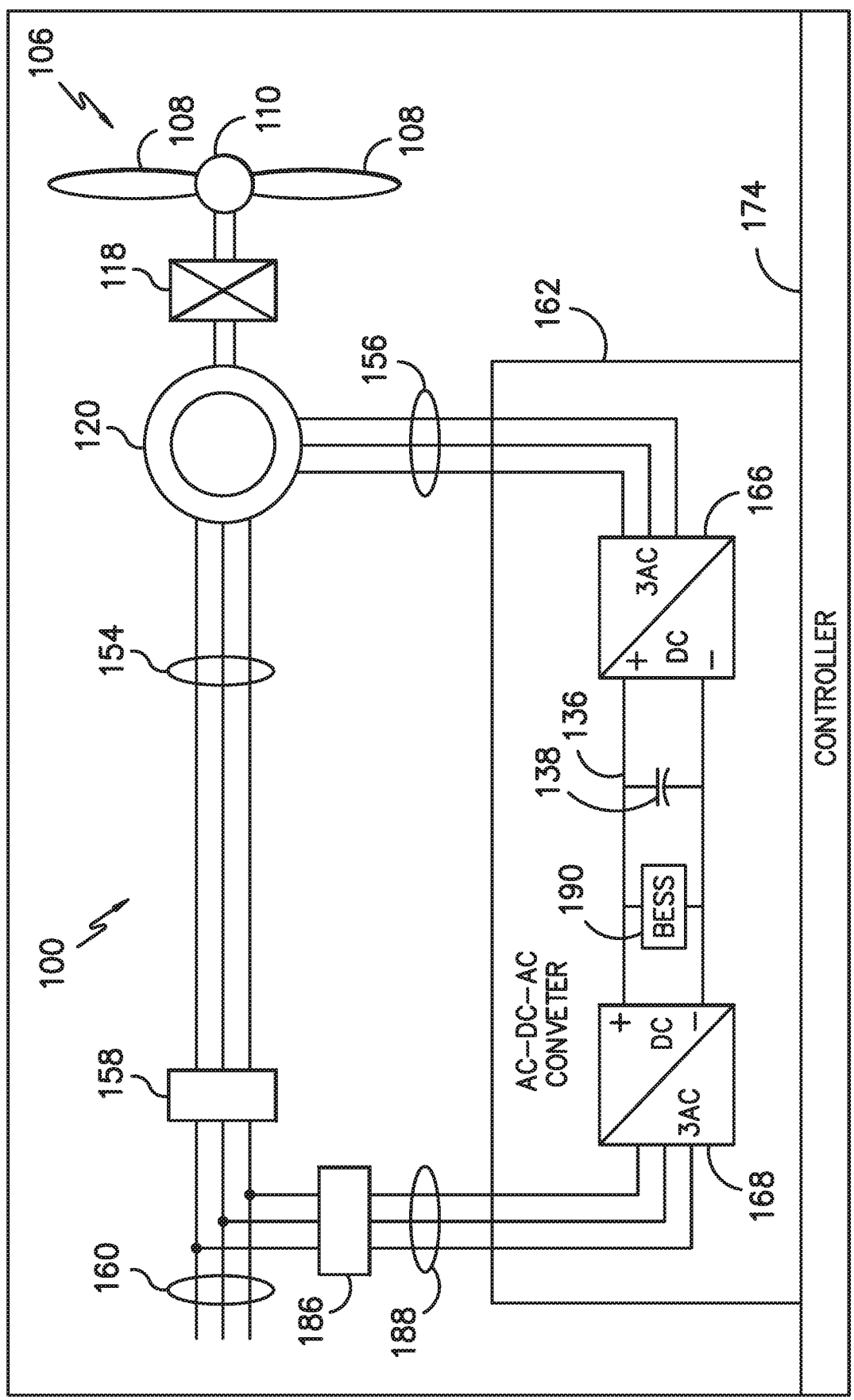
FIG. -1-

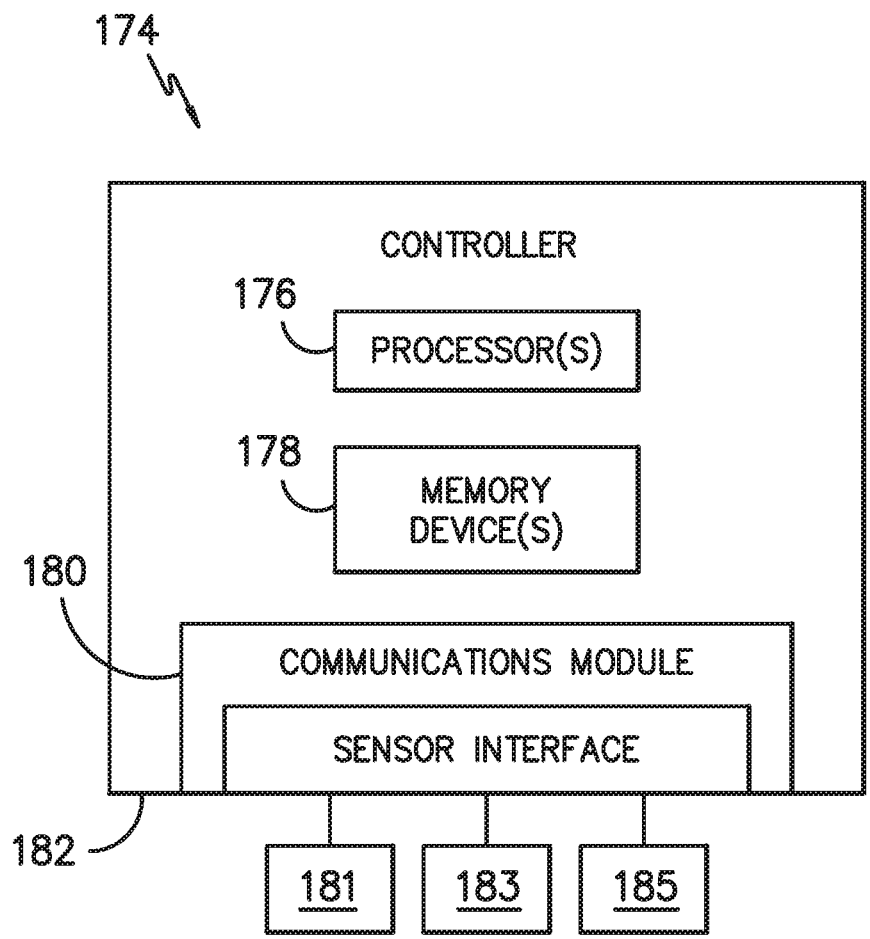
FIG. -2-

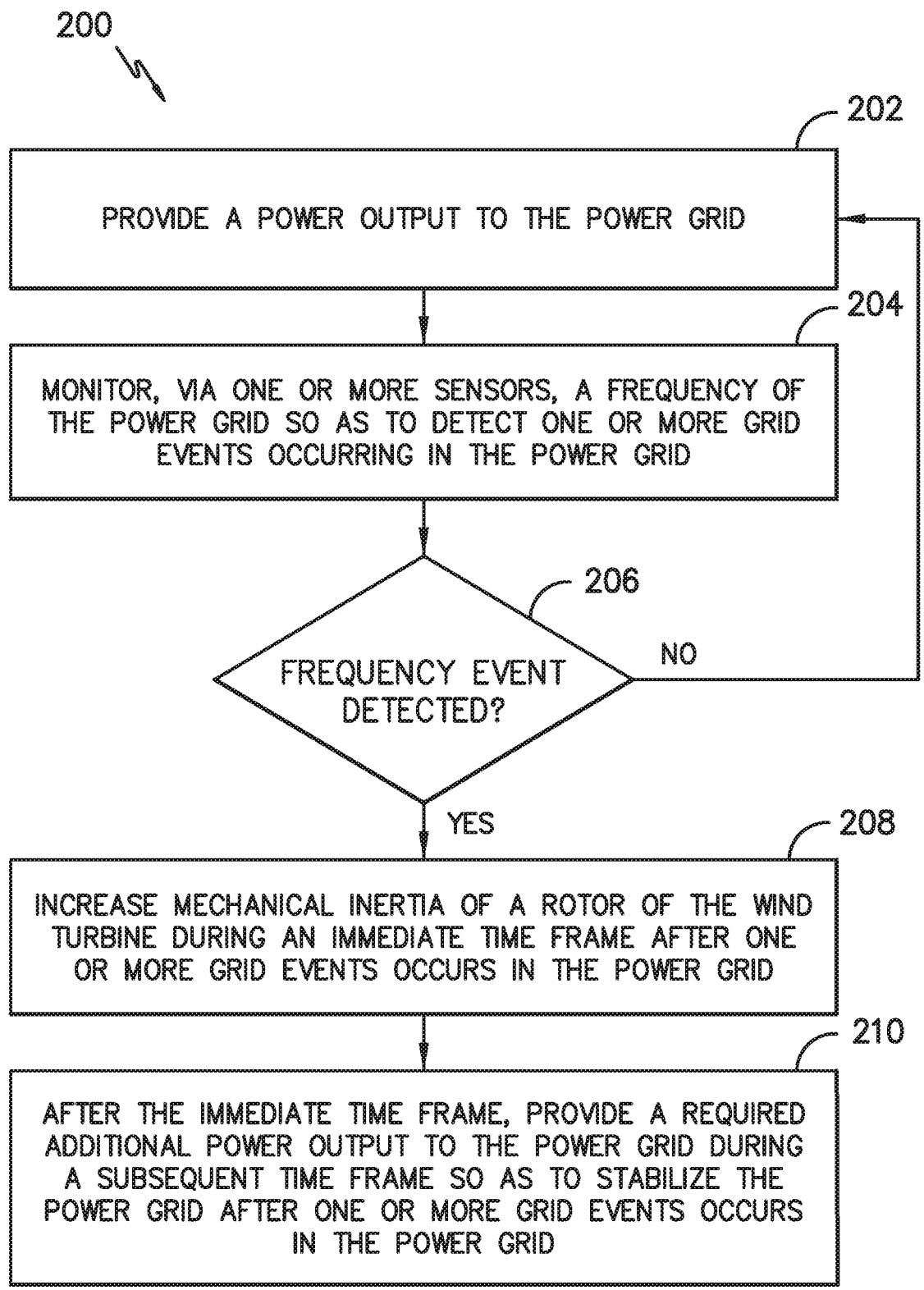
FIG. -3-

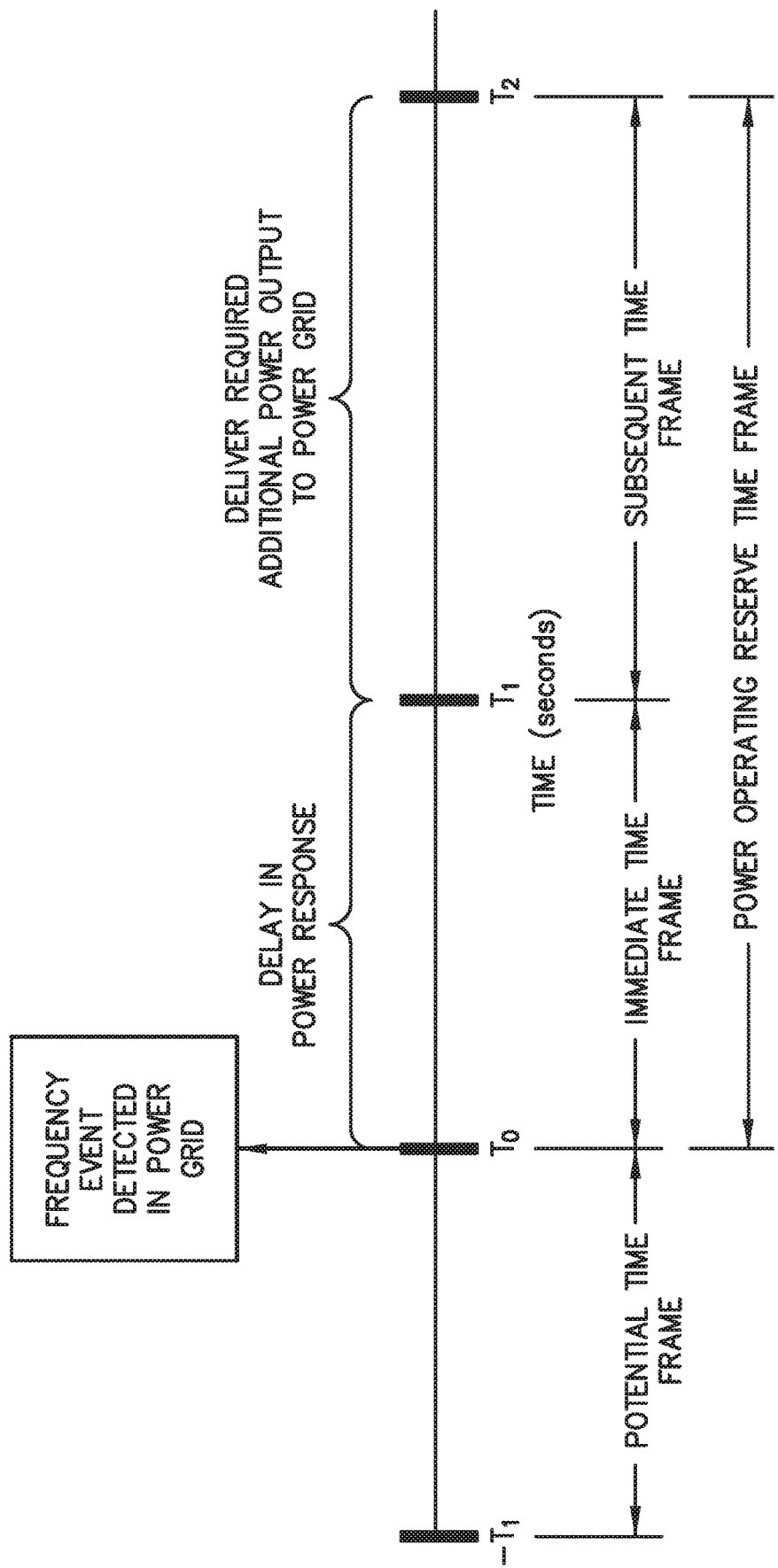

SYSTEM AND METHOD FOR INCREASING MECHANICAL INERTIA OF A WIND TURBINE ROTOR TO SUPPORT A POWER GRID DURING AN OVER-FREQUENCY OR UNDER-FREQUENCY DISTURBANCE OF THE GRID

FIELD

The present disclosure relates generally to wind turbines, and more particular to systems and methods for increasing the mechanical inertia of a wind turbine rotor immediately after the occurrence of a frequency grid event such that the wind turbine can provide additional power output to stabilize the grid.

BACKGROUND

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Grid integration of wind turbines can be complicated by a number of issues, primarily related to wind variability and the electrical characteristics of wind generators. A typical wind turbine appears to the grid as a substantially different generation source than a conventional power plant. The most significant difference is that the wind turbine is inherently uncontrollable. Such uncontrolled real power output variations can have an impact on the grid, including frequency variations. In addition, the electrical characteristics of wind generators result in a disturbance response that is naturally different from that of conventional synchronous generators. Without special controls, a wind turbine does not inherently participate in the regulation of grid frequency. By contrast, synchronous machines do participate in frequency regulation through their inherent inertia, and their governor controls. When wind generator displaces conventional synchronous generation, the burden of frequency regulation placed upon the remaining synchronous generators is increased.

Frequency control is a particularly significant issue with high levels of wind and solar penetration, in weak systems, and in control areas where tie-line interchange is constrained or non-existent. Therefore, it is desirable to provide a system that is capable of increasing the mechanical inertia of the wind turbine rotor immediately after the occurrence of a frequency grid event such that the wind turbine can provide additional power output to stabilize the grid.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine connected to a power grid in response to one or more grid events occurring in the power grid. The method includes monitoring, via one or more sensors, a frequency of the power grid so as to detect one or more grid events occurring in the power grid. In response to detecting one or more grid events occurring in the power grid, the method includes increasing mechanical inertia of a rotor of the wind turbine during a first time frame immediately after one or more grid events occurs in the power grid. After the first time frame, the method includes providing a required additional power output to the power grid during a subsequent, second time frame so as to stabilize the power grid after one or more grid events occurs in the power grid.

In one embodiment, the method may include reducing a torque of the wind turbine during the first time frame after one or more grid events occurs in the power grid. In such embodiments, the method may also include simultaneously increasing mechanical inertia of the rotor of the wind turbine and reducing the torque of the wind turbine during the first time frame after one or more grid events occurs in the power grid. In several embodiments, the step of increasing mechanical inertia of the rotor of the wind turbine may include, e.g. increasing a rotor speed of the rotor.

In further embodiments, the first time frame may range from about zero (0) seconds to about five (5) seconds. Thus, the second time frame may range from about five (5) seconds to about fifteen (15) seconds.

In particular embodiments, the required additional power output may be greater than about 10% of rated power of the wind turbine. In certain embodiments, the required additional power output may be greater than energy consumed in a predetermined time frame after one or more grid events occurs in the power grid. As such, the predetermined time frame may range from about ten (10) seconds to about twenty (20) seconds.

In another aspect, the present disclosure is directed to a system for operating a wind turbine connected to a power grid in response to one or more grid events occurring in the power grid. The system includes one or more sensors configured to monitor a frequency of the power grid so as to detect one or more grid events occurring in the power grid and a controller communicatively coupled to the sensor(s). The controller is configured to perform one or more operations, including but not limited to, in response to detecting one or more grid events occurring in the power grid, increasing mechanical inertia of a rotor of the wind turbine during a first time frame after one or more grid events occurs in the power grid, and after the first time frame, providing a required additional power output to the power grid during a subsequent, second time frame so as to stabilize the power grid after one or more grid events occurs in the power grid. It should also be understood that the system may further include any of the additional features as described herein.

In yet another aspect, the present disclosure is directed to a method for operating a wind turbine connected to a power grid. The method includes providing, via the wind turbine, a power output to the power grid. The method also includes receiving, via the wind turbine, a frequency of the power grid so as to detect one or more grid events occurring in the power grid. In response to one or more grid events occurring in the power grid, the method includes simultaneously increasing a rotor speed of a rotor of the wind turbine and reducing a torque of the wind turbine during a first time frame after the one or more grid events occurs in the power grid. After the first time frame, the method includes providing an increased power output to the power grid during a subsequent, second time frame so as to stabilize the power grid after one or more grid events occurs in the power grid. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram of one embodiment of a wind turbine power system according to the present disclosure;

FIG. 2 illustrates a block diagram of one embodiment of a controller suitable for use with the wind turbine power system shown in FIG. 1;

FIG. 3 illustrates a schematic diagram of one embodiment of a timeline of operation of a wind turbine power system following a frequency grid event in a power grid according to the present disclosure; and, FIG. 4 illustrates a flow diagram of one embodiment of a method for operating a wind turbine connected to a power grid according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 100 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gearbox 118, which is, in turn, coupled to a generator 120. In accordance with aspects of the present disclosure, the generator 120 may be any suitable generator, including, but not limited to a doubly fed induction generator (DFIG) or a fully fed induction generator. The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

Referring to the power converter 162, the DFIG 120 is coupled via the rotor bus 156 to a rotor-side converter 166. The rotor-side converter 166 is coupled to a line-side converter 168 which in turn is coupled to a line-side bus 188. In example configurations, the rotor-side converter 166 and the line-side converter 168 are configured for normal operating mode in a three-phase, pulse width modulation (PWM) arrangement using insulated gate bipolar transistor (IGBT) switching elements. The rotor-side converter 166 and the line-side converter 168 can be coupled via a DC link 136 across which is the DC link capacitor 138.

The power system 100 may also include a controller 174 configured to control the operation of the various components of the system 100 as well as implementing any method steps as described herein. Thus, the controller 174 can include any number of control devices. In one implementation, as shown in FIG. 2, the controller 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands to the various system components. Additionally, the controller 174 may include a communications module 180 to facilitate communications between the controller 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 174 to perform the various functions as described herein.

During operation, alternating current (AC) power generated at the DFIG 120 by rotation of the rotor 106 is provided via a dual path to an electrical grid 160. The dual paths are defined by the stator bus 154 and the rotor bus 156. On the rotor bus side 156, sinusoidal multi-phase (e.g. three-phase) AC power is provided to the power converter 162. The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz).

Various circuit breakers and switches, such as a converter breaker 186, can be included in the power system 100 to connect or disconnect corresponding buses, for example, when current flow is excessive and can damage components of the system 100 or for other operational considerations. Additional protection components can also be included in the power system 100.

Still referring to FIG. 1, the power system 100 may also include a battery energy storage system (BESS) 190 coupled to the power converter 162. More specifically, as shown in the illustrated embodiment, the BESS 190 can be connected in parallel with the DC link 136 of the power converter 162. The battery energy storage system 190 can be used to provide power to the DC link 136 under certain conditions. For instance, the BESS 190 can be used to provide power to the DC link 136 to increase output of the power system 100 when wind speed drops. Power can also be supplied and stored in the BESS 190 during operation of the power system 100.

Referring now to FIG. 3, a flow diagram of one embodiment of a method 200 for operating a wind turbine connected to a power grid in response to one or more grid events occurring in the power grid is illustrated. In general, the method 200 will be described herein with reference to the wind turbine 100 shown in FIG. 1. However, it should be appreciated that the disclosed method 200 may be implemented with wind turbines having any other suitable configurations. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include providing a power output to the power grid 160, e.g. via the wind turbine power system 100. In other words, during normal operation, the wind turbine power system 100 is configured to generate a rated power and provide the generated power to the power grid 160. As shown at (204), the method 200 may include monitoring, via one or more sensors, a frequency of the power grid so as to detect one or more grid events occurring in the power grid 160. For example, in one embodiment, the sensors 181, 183, 185 described herein are configured to continuously monitor one or more electrical conditions (e.g. frequency, voltage, current, etc.) of the power grid 160 and send the sensor signals to the controller 174. As such, the controller 174 is configured to determine whether a frequency grid event is occurring the power grid 160 based on the sensor signals. As described herein, a frequency grid event generally encompasses any over-frequency or under-frequency disturbance in the grid that can potentially diminish grid performance.

As shown at (206), the method 200 includes determining whether e frequency event has been detected. If so, as shown at (208), the method 200 includes increasing or charging mechanical inertia of the rotor 106 of the wind turbine 100 during an immediate time frame (also referred to herein as a first time frame) after one or more grid events occurs in the power grid 160. For example, in several embodiments, the mechanical inertia of the rotor 106 may be increased by increasing a rotor speed of the rotor 106. Thus, during the time frame immediately following the grid event, additional mechanical inertia may be generated and stored such that the additional energy can be used to provide an increase in power as described below.

In addition, in certain embodiments, the method 200 may include reducing a torque of the wind turbine 100 during the immediate time frame after one or more grid events occurs in the power grid 160. In such embodiments, the controller 174 may simultaneously increase the mechanical inertia of the rotor 106 and reduce the torque of the wind turbine 100 during the immediate time frame after one or more grid events occurs in the power grid 160. The immediate time frame following the frequency grid event as described herein may range from about zero (0) seconds to about five (5) seconds.

After the immediate time frame, as shown at (210), the method 200 includes providing a required additional power output to the power grid 160 during a subsequent, second time frame so as to stabilize the power grid 160 after one or more grid events occurs in the power grid 160. The second time frame following the immediate time frame as described herein may range from about five (5) seconds to about fifteen (15) seconds. In particular embodiments, the required additional power output may be greater than about 5% to 10% of the rated power of the wind turbine 100. To reach this value, the torque margin of the wind turbine power system 100 is often at its limit. However, by increasing the rotor speed in the immediate time frame, the torque can be reduced as well to maintain the demanded power output. Thus, such actions provide an additional torque margin to deliver the required additional power output in the second time frame. In addition, in one embodiment, the required additional power output may be greater than energy consumed in a predetermined time frame after one or more grid events occurs in the power grid 160. More specifically, the duration of the power increase may be on the order of several seconds. For example, in one embodiment, the predetermined time frame described herein may range from about ten (10) seconds to about twenty (20) seconds.

The method 200 of FIG. 3 can be better understood with respect to FIG. 4. As an initial point, the system and method of the present disclosure includes transferring the mechanical inertia of the wind turbine rotor 106 into a temporary increase of electrical power for transient under frequency grid events. More specifically, the system and method of the present disclosure includes focuses on the Power Operating Reserve (POR). The POR is generally defined as the additional power output required at the frequency nadir (i.e. minimum) compared to the pre-frequency event power output, which is fully available and sustainable between $T_1$ and $T_2$, e.g. 5 seconds and 15 seconds after the event (where the nadir occurs between 5 and 15 seconds after the event, but with timing being grid code specific). Thus, the POR time frame is illustrated in FIG. 4 and includes the Immediate Time Frame described herein (e.g. about 5 seconds).

In addition, as shown, the frequency grid event is detected at $T_0$. In the Immediate Time Frame following detection of the frequency grid event (between $T_0$ and $T_1$), there is a delay in the power response of the wind turbine power system 100. More specifically, in certain embodiments, the controller 174 delays the power response and charges the rotor 106 in the first few seconds after the frequency event by increasing the rotor speed of the rotor 106. At the same time, the controller 174 may also decrease the torque of the wind turbine power system 100 to maintain the demanded power output from the power grid 160. Such actions provide additional mechanical inertia and speed/torque margin for the wind turbine power system 100 to deliver the required additional power output to stabilize the power grid 160. Thus, as shown in the subsequent, second time frame between $T_1$ and $T_2$, the wind turbine power system 100 delivers the required additional power output to the power grid 160 so as to stabilize the grid 160. In certain embodiments, the energy delivered during the frequency events is higher than the energy consumed in the following 10 to 20 seconds after the frequency event. In addition, the rotor speed may not drop as high below the original speed set-point and the wind turbine power system 100 may be capable to recover to its previous power output faster. Further, the additional power output during a frequency event must be held for certain time frame (e.g. greater than 10 seconds) as required by the power grid 160. By increasing the mechanical inertia via increasing the rotor speed, the power output can be more stable especially at the end of the POR time frame when the rotor inertia is typically used up.

Still referring to FIG. 4, before the Immediate Time Frame, the controller 174 may evaluate a Potential Time Frame, i.e. before the frequency grid event occurs and is detected. As such, if the controller 174 detects that the grid frequency is dropping, the controller 174 may also be configured to increase the rotor speed during this time frame as well. Accordingly, such action(s) by the controller 174 provide potential time to charge the rotor 106 if the Immediate Time Frame is insufficient (e.g. due to grid requirements, such as fast frequency response "FFR"). More specifically, in one embodiment, the Potential Time Frame may correspond to a time frame related to the actual value and rate of change of the grid frequency towards a certain threshold. As used herein, the FFR generally refers to the instance where the Immediate Time Frame is equal to zero seconds, which is the potential time frame related to the grid frequency.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine connected to a power grid, the wind turbine providing a power output demanded by the power grid, in response to an over-frequency or under-frequency disturbance of the power grid, the method comprising:

monitoring, via one or more sensors, the power grid to detect the over-frequency or under-frequency disturbance that results from a load-to-power imbalance in the power grid;

during a first time frame immediately after detecting the over-frequency or under-frequency disturbance, delaying a power response of the wind turbine to the power grid and also simultaneously increasing a rotor speed of a rotor of the wind turbine to increase a mechanical inertia of the rotor, so as to maintain the power output demanded by the power grid, from and supplied by the wind turbine, as defined before detection of the load-to-power imbalance, wherein the power response comprises providing an additional power output from the wind turbine to the power grid in response to the load-to-power imbalance; and, after the first time frame, during a subsequent, second time frame, no longer delaying the power response from the wind turbine to the power grid, and providing an additional power output required by the power grid after the load-to-power imbalance using the increased mechanical inertia of the rotor, wherein the additional power output is required by the power grid to resolve the over-frequency or under-frequency disturbance.

2. The method of claim 1, wherein the first time frame ranges from about zero (0) seconds to about five (5) seconds.

3. The method of claim 1, wherein the second time frame ranges from about five (5) seconds to about fifteen (15) seconds.

4. The method of claim 1, wherein the additional power output is greater than about 10% of rated power of the wind turbine.

5. A system for operating a wind turbine in response to an over-frequency or under-frequency disturbance of a power grid, the wind turbine connected to the power grid and providing a power output demanded by the power grid, the system comprising:

one or more sensors configured to monitor the power grid to detect the over-frequency or under-frequency disturbance that results from a load-to-power imbalance in the power grid; and, a controller communicatively coupled to the one or more sensors, the controller configured to perform one or more operations, the one or more operations comprising:

receiving an indication of detecting the over-frequency or under-frequency disturbance;

during a first time frame immediately after detecting the over-frequency or under-frequency disturbance, delaying a power response of the wind turbine to the power grid and also simultaneously increasing a rotor speed of a rotor of the wind turbine to increase a mechanical inertia of the rotor, so as to maintain the power output demanded by the power grid and supplied by the wind turbine, as defined before detection of the load-to-power imbalance, wherein the power response comprises providing an additional power output from the wind turbine to the power grid in response to the load-to-power imbalance; and, after the first time frame, during a subsequent, second time frame, no longer delaying the power response from the wind turbine to the power grid, and providing the additional power output required by the power grid after the load-to-power imbalance using the increased mechanical inertia of the rotor;

wherein the additional power output is required by the power grid to resolve the over-frequency or under-frequency disturbance.

6. The system of claim 5, wherein the first time frame ranges from about zero (0) seconds to about five (5) seconds.

7. The system of claim 5, wherein the second time frame ranges from about five (5) seconds to about fifteen (15) seconds.

8. The system of claim 5, wherein the additional power output is greater than about 10% of rated power of the wind turbine.

* * * * *